(12) United States Patent
Wang (10) Patent No.: US 10,280,912 B2
(45) Date of Patent: May 7, 2019

(54) AIR VALVE CONNECTING DEVICE FOR DIFFERENT INFLATION VALVES

(71) Applicant: Beto Engineering & Marketing Co., Ltd., Taichung (TW)

(72) Inventor: Lo Pin Wang, Taichung (TW)

(73) Assignee: Beto Engineering & Marketing Co., Ltd., Beitun, Taichung (TW)

( * ) Notice: Subject to any disclaimer, the term of this patent is extended or adjusted under 35 U.S.C. 154(b) by 225 days.

(21) Appl. No.: 15/408,612

(22) Filed: Jan. 18, 2017

(65) Prior Publication Data
US 2018/0202565 A1  Jul. 19, 2018

(51) Int. Cl.
| F04B 33/00 | (2006.01) |
| F04B 39/10 | (2006.01) |
| F04B 39/12 | (2006.01) |
| F04B 39/14 | (2006.01) |
| F16K 1/00 | (2006.01) |

(52) U.S. Cl.
CPC ............ *F04B 33/005* (2013.01); *F04B 39/10* (2013.01); *F04B 39/123* (2013.01); *F04B 39/14* (2013.01); *F16K 1/00* (2013.01)

(58) Field of Classification Search
CPC ........ B60C 29/00; B60C 29/005; F16K 15/20
USPC ............................................ 141/38; 137/223
See application file for complete search history.

(56) References Cited

U.S. PATENT DOCUMENTS

| 5,638,865 A * | 6/1997 | Wu ..................... F16K 11/0876 |
| | | 137/223 |
| 5,921,269 A * | 7/1999 | Wu .......................... B60S 5/04 |
| | | 137/223 |
| 5,960,815 A | 10/1999 | Wang |
| 6,105,600 A | 8/2000 | Wang |
| 6,105,601 A | 8/2000 | Wang |
| 6,260,572 B1 * | 7/2001 | Wu ....................... F04B 33/005 |
| | | 137/223 |
| 6,328,057 B1 | 12/2001 | Wang |
| 6,978,796 B2 * | 12/2005 | Ostrowiecki ....... F16K 17/0413 |
| | | 137/223 |
| 7,032,612 B2 * | 4/2006 | Shipman ................. F16K 15/20 |
| | | 137/231 |
| 7,866,335 B2 | 1/2011 | Wang |
| 8,539,971 B2 | 9/2013 | Wang |
| 9,249,914 B2 * | 2/2016 | Kuo ......................... F16L 37/28 |
| 2017/0225528 A1 * | 8/2017 | Cheng ................... B29C 73/166 |

* cited by examiner

*Primary Examiner* — Timothy L Maust
(74) *Attorney, Agent, or Firm* — Charles E. Baxley (57) ABSTRACT

An air valve connecting device includes a barrel rotatably connected to a housing, the barrel includes an enlarged space having a screw hole for engaging with a U.S. type inflation valve, and having an inner thread for selectively engaging with a French type inflation valve and for detachably securing the French type inflation valve to the barrel, and a shank is slidably engaged in the housing and includes one end portion for receiving the pressurized air, and the shank includes a front end portion having a mouth movable toward the barrel for selectively engaging with either the U.S. type inflation valve or the French type inflation valve.

13 Claims, 11 Drawing Sheets

AIR VALVE CONNECTING DEVICE FOR DIFFERENT INFLATION VALVES

BACKGROUND OF THE INVENTION

1. Field of the Invention

The present invention relates to an air valve connecting head or device, and more particularly to an air valve connecting device including a simplified or improved structure for easily connecting to different inflation valves and for being easily actuated or operated with a single hand of the user and for being easily manufactured with a decreased manufacturing procedure and cost.

2. Description of the Prior Art

Various kinds of typical air valve connecting devices have been developed and comprise a valve housing including one end for connecting or coupling to a pressurized air reservoir and for receiving the pressurized air from the pressurized air reservoir, and a fitting port formed in the other end of the valve housing for receiving or engaging with an inflation valve and for inflating the balls, the inner tires of the bicycles or the motorcycles or the vehicles, the present inventor has developed various kinds of air valve connecting devices.

For example, U.S. Pat. No. 5,960,815 to Wang, U.S. Pat. No. 6,105,600 to Wang, U.S. Pat. No. 6,105,601 to Wang, U.S. Pat. No. 6,328,057 to Wang, U.S. Pat. No. 7,866,335 to Wang, and U.S. Pat. No. 8,539,971 to Wang disclose several of the typical air valve connecting heads for a hand-held air pump and also comprising a valve housing including one end for connecting or coupling to a pressurized air reservoir, and including a fitting port formed in an elastic annular block for engaging with an inflation valve.

However, normally, the typical air valve connecting heads required to be provided with an actuating handle or hand grip to be grasped or held or operated with one hand of the user, and the user has to use the other hand to grasp and actuate or operate the valve housing, such that the typical air valve connecting heads comprise a structure that may not be easily operated or may not effectively grasping or holding the different inflation valves and may comprise a greatly increased manufacturing cost and manufacturing procedures.

The present invention has arisen to mitigate and/or obviate the afore-described disadvantages of the conventional air valve connecting devices.

SUMMARY OF THE INVENTION

The primary objective of the present invention is to provide an air valve connecting device including a simplified or improved structure for easily connecting to different inflation valves and for being easily actuated or operated with a single hand of the user and for being easily manufactured with a decreased manufacturing procedure and cost.

In accordance with one aspect of the invention, there is provided an air valve connecting device comprising a housing including a chamber formed therein, and including a first end portion and a second end portion, a barrel including a first end portion rotatably connected to the housing, and the barrel including a bore formed therein, and the barrel including an enlarged space formed in a second end portion of the barrel and communicating with the bore of the barrel, and a screw hole formed in the space at the second end portion of the barrel for engaging with a U.S. type inflation valve and for detachably securing the U.S. type inflation valve to the barrel, and the barrel including an inner thread formed therein for selectively engaging with a French type inflation valve and for detachably securing the French type inflation valve to the barrel, and a shank slidably engaged in the chamber of the housing, the shank including a bore formed therein for receiving a pressurized air, and the shank including a first end portion for receiving the pressurized air, and the shank including a second end portion movable toward the barrel for selectively engaging with either the U.S. type inflation valve or the French type inflation valve and for suitably filling or supplying the pressurized air to either the U.S. type inflation valve or the French type inflation valve.

The shank includes an extension extended forwardly therefrom and slidably engaged in the chamber of the housing and slidably engaged in the bore of the barrel. The shank includes a mouth provided in the second end portion at the extension thereof for selectively engaging with either the U.S. type inflation valve or the French type inflation valve.

The shank includes a peripheral groove formed in the extension of the shank for engaging with a sealing ring which is engaged with the barrel for making an air tight seal between the barrel and the shank. The extension of the shank includes a reduced outer diameter than that of the shank for forming an inner peripheral shoulder between the shank and the extension.

The housing includes a peripheral bulge extended radially and inwardly into the chamber of the housing for engaging with the inner peripheral shoulder of the shank for limiting the shank to move relative to the housing. The barrel includes a gasket engaged into the barrel for engaging with either U.S. type or the French type inflation valve. The housing includes a peripheral bulge extended radially and inwardly into the chamber of the housing for engaging with the barrel and for limiting the barrel to move relative to the housing.

The housing includes a slot formed therein, and an anchor is attached to the shank and slidably engaged with the slot of the housing for guiding and limiting the shank to move relative to the housing and the barrel. The slot of the housing is a selected from a longitudinal slot. The housing includes a lateral slot formed therein and communicating with the longitudinal slot of the housing for forming or defining an L-shaped guiding or limiting slot therein, and for slidably engaging with the anchor.

A clamping ring is engaged between the barrel and the housing for positioning the barrel to the housing and for preventing the barrel from being disengaged from the housing. The first end portion of the shank is connected to a hose for receiving the pressurized air from the hose. A shield is engaged onto the hose and the first end portion of the shank for clamping and securing the hose to the shank and for preventing the hose from being disengaged from the shank.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
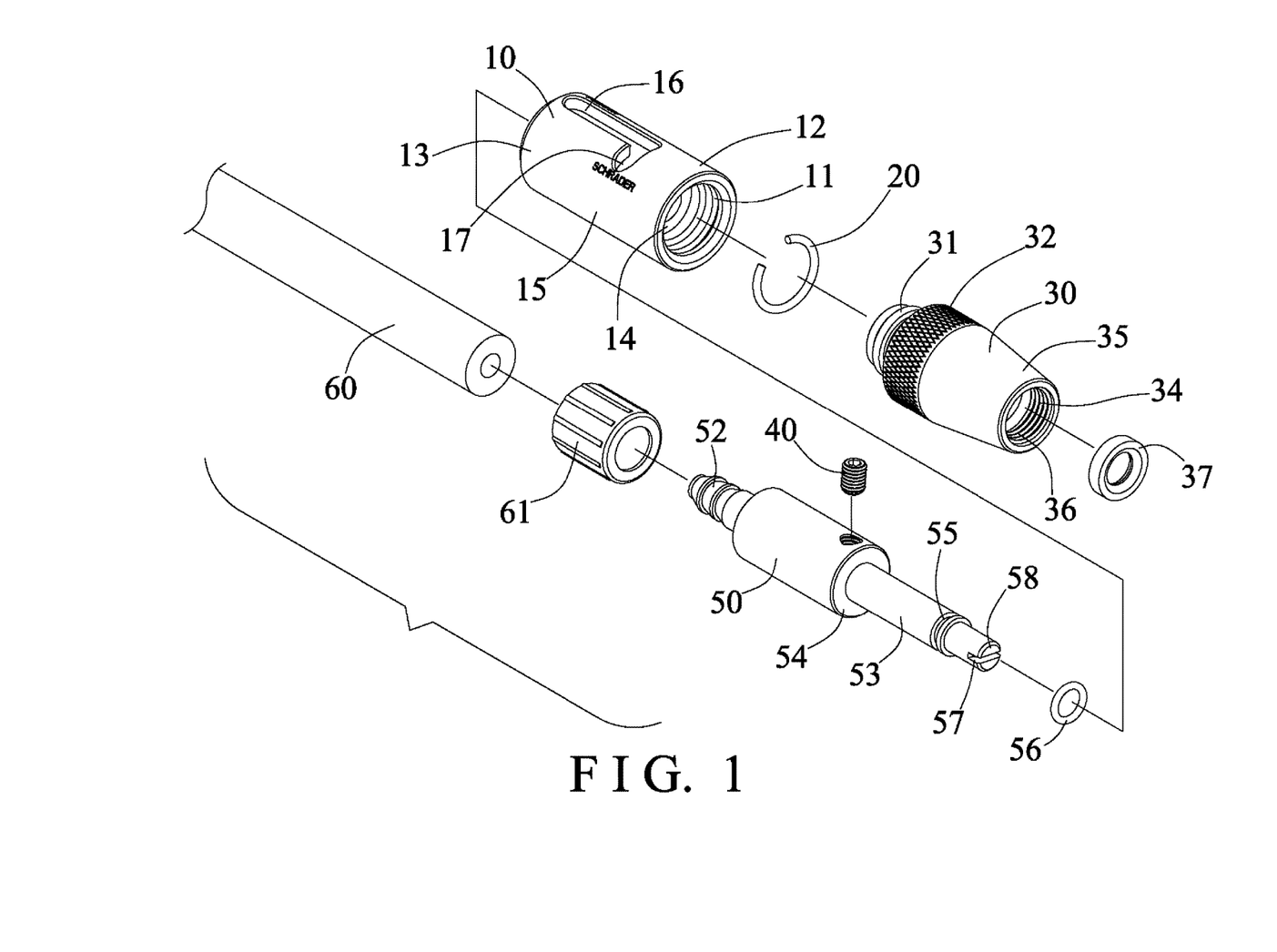
FIG. 1 is a partial exploded view of an air valve connecting device in accordance with the present invention.
Figure 2:
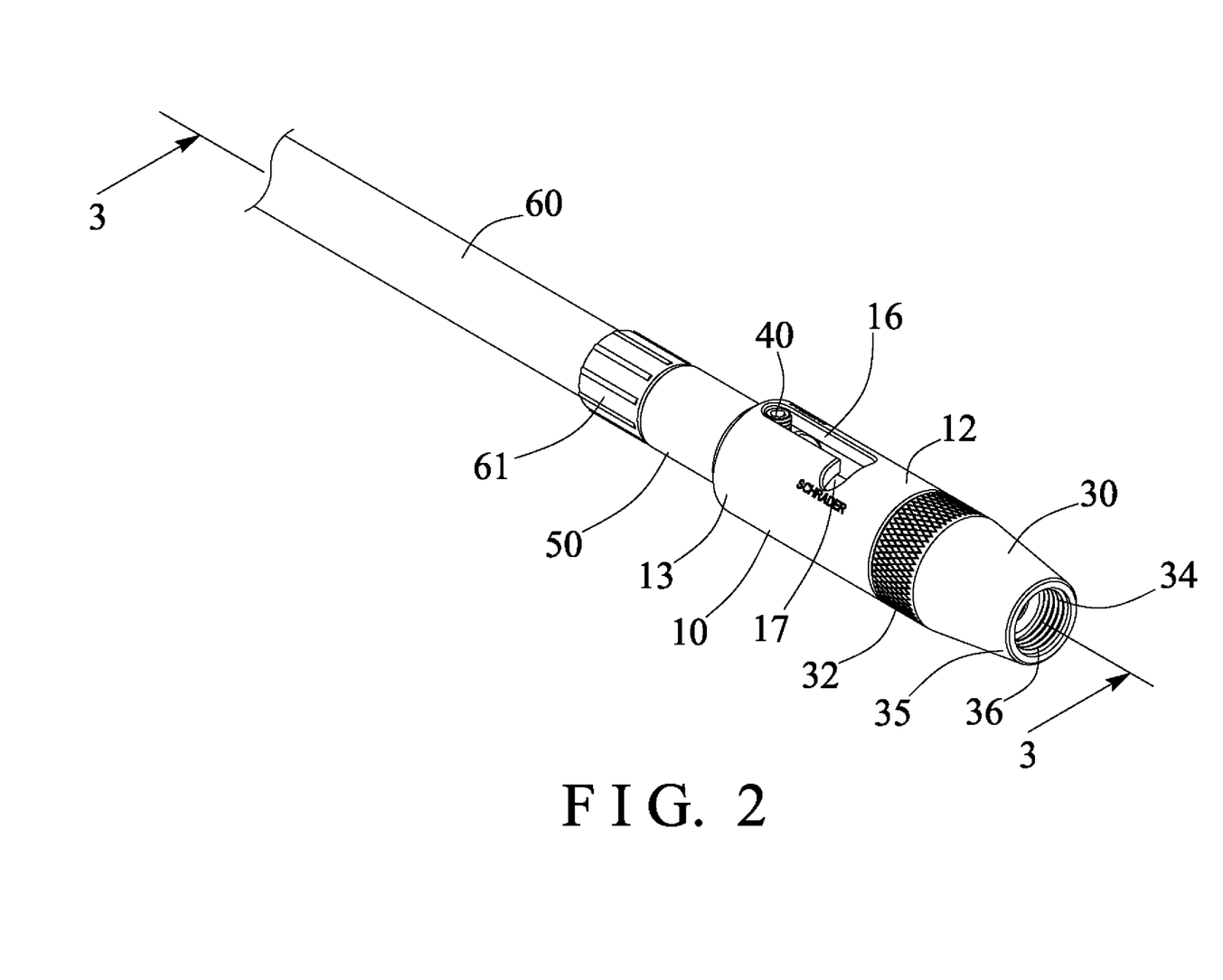
FIG. 2 is a perspective view of the air valve connecting device.
Figure 3:
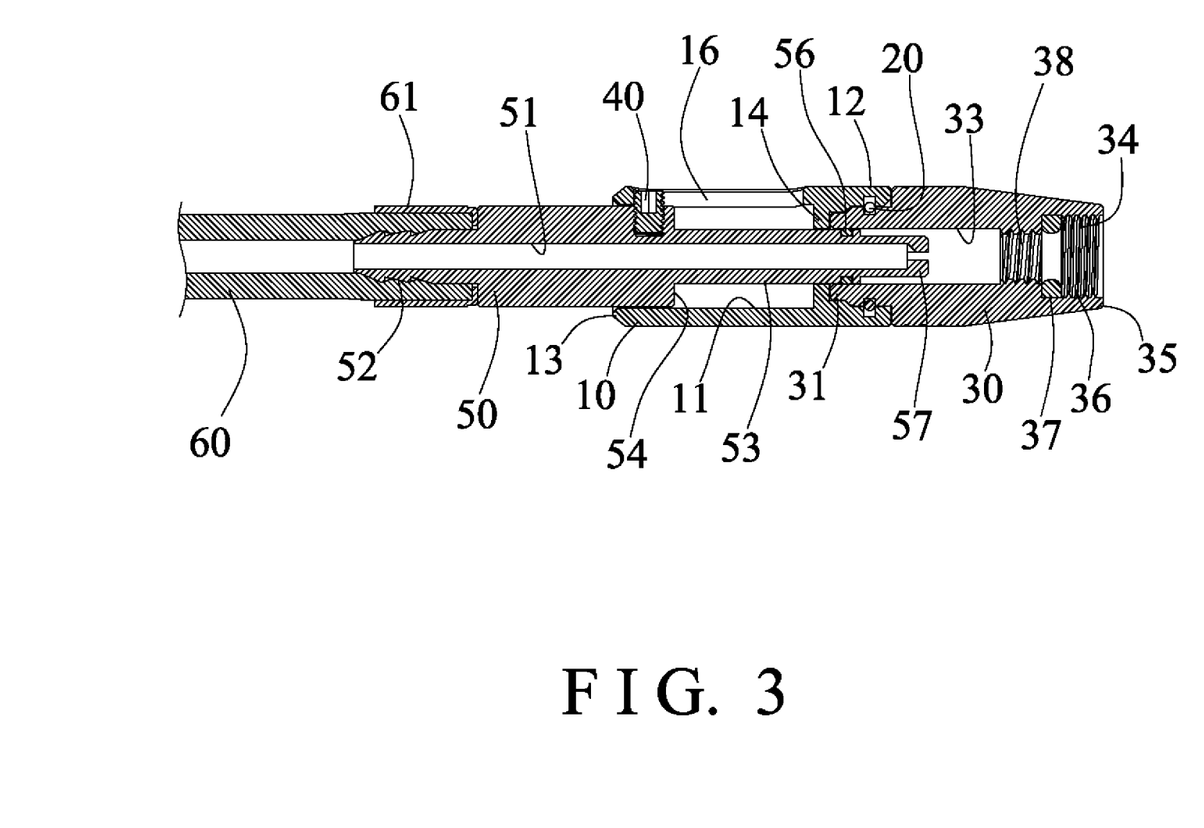
FIG. 3 is cross sectional view of the air valve connecting device, taken along lines 3-3 of FIG. 2.

Referring to the drawings, and initially to FIGS. 1-3, an air valve connecting device in accordance with the present invention comprises a valve connecting body or housing 10 including a bore or chamber 11 formed therein, and including one or front or first end portion 12 and another or rear or second end portion 13, and a peripheral swelling or bulge 14 extended radially and inwardly therefrom, such as extended radially and inwardly into the chamber 11 at the middle or intermediate portion 15 of the housing 10. The housing 10 further includes a longitudinal slot 16 and a lateral slot 17 formed or provided therein and intersecting or communicating with each other and for forming or defining an L-shaped guiding or limiting slot 16, 17 therein, and also communicating with the chamber 11 of the housing 10.

A cylindrical tube or barrel 30 is pivotally or rotatably connected or coupled to the housing 10, for example, the barrel 30 includes one or front or first end portion 31 pivotally or rotatably engaged with or into the chamber 11 at the front or first end portion 12 of the housing 10 and contacted or engaged with the peripheral bulge 14 of the housing 10 which may pivotally or rotatably anchor and position the barrel 30 to the housing 10 and which may prevent the barrel 30 from sliding or moving longitudinally or axially relative to the housing 10. A gasket or sealing ring or clamping ring 20 is engaged between the barrel 30 and the housing 10 for further solidly and stably anchoring or retaining or positioning the barrel 30 to the housing 10 and for preventing the barrel 30 from being disengaged or separated from the housing 10.

The barrel 30 includes an embossed or knurled or serrated bore the user and for suitably and effectively pivoting or rotating the barrel 30 relative to the housing 10. The barrel 30 includes a compartment or bore 33 formed therein (FIGS. 3, 4), and includes an enlarged opening or space 34 formed or provided in the other or second end portion 35 thereof and communicating with the bore 33 of the barrel 30, and includes an inner thread or a screw hole 36 formed in the space 34 at the second end portion 35 of the barrel 30 for threading or engaging with an inflation valve 8, such as a U.S. type inflation valve 8 or the other inflation valves or the like, and for detachably or releasably attaching or securing the U.S. type inflation valve 8 to the barrel 30.

Figure 5:
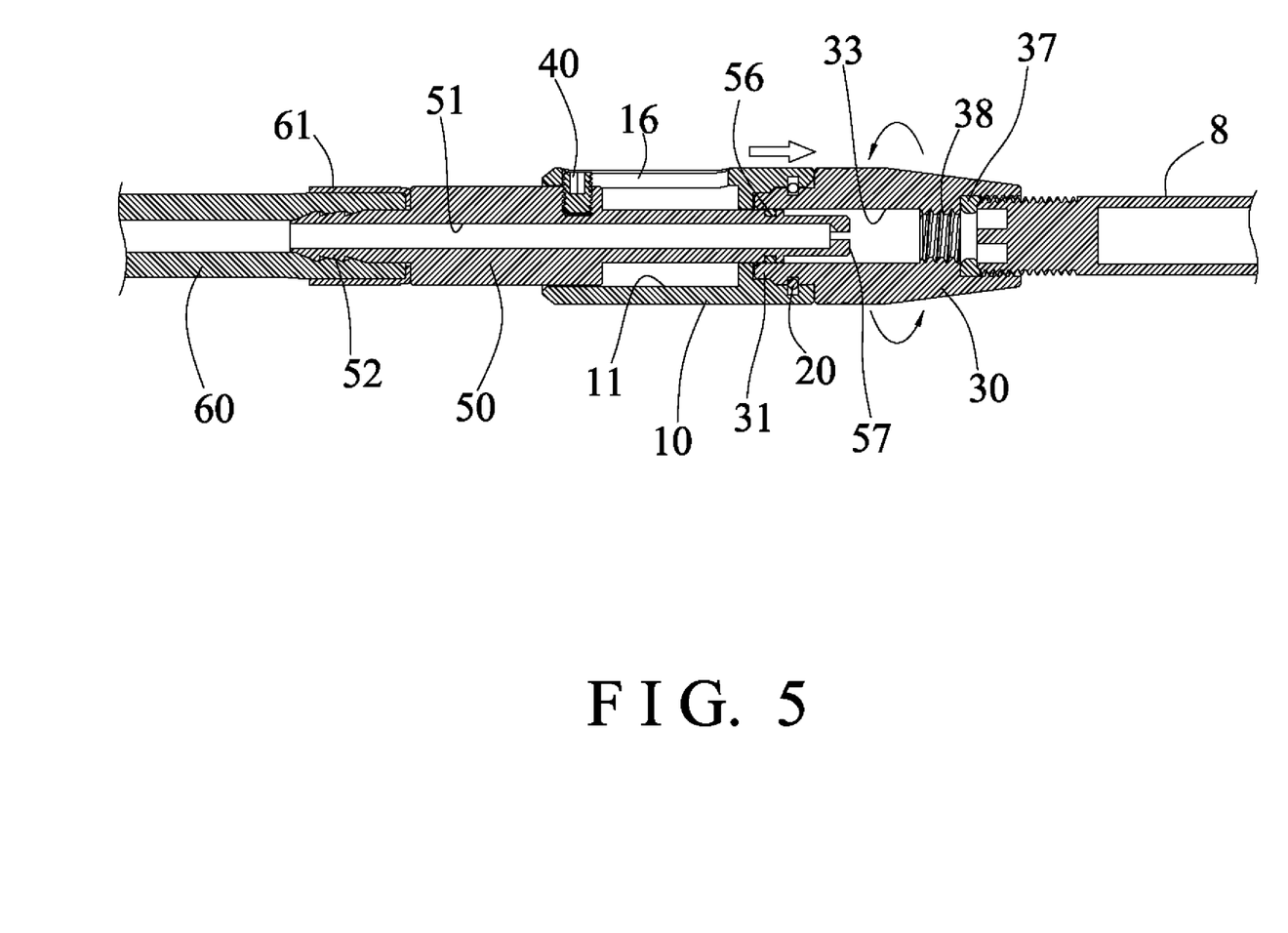
Figure 6:
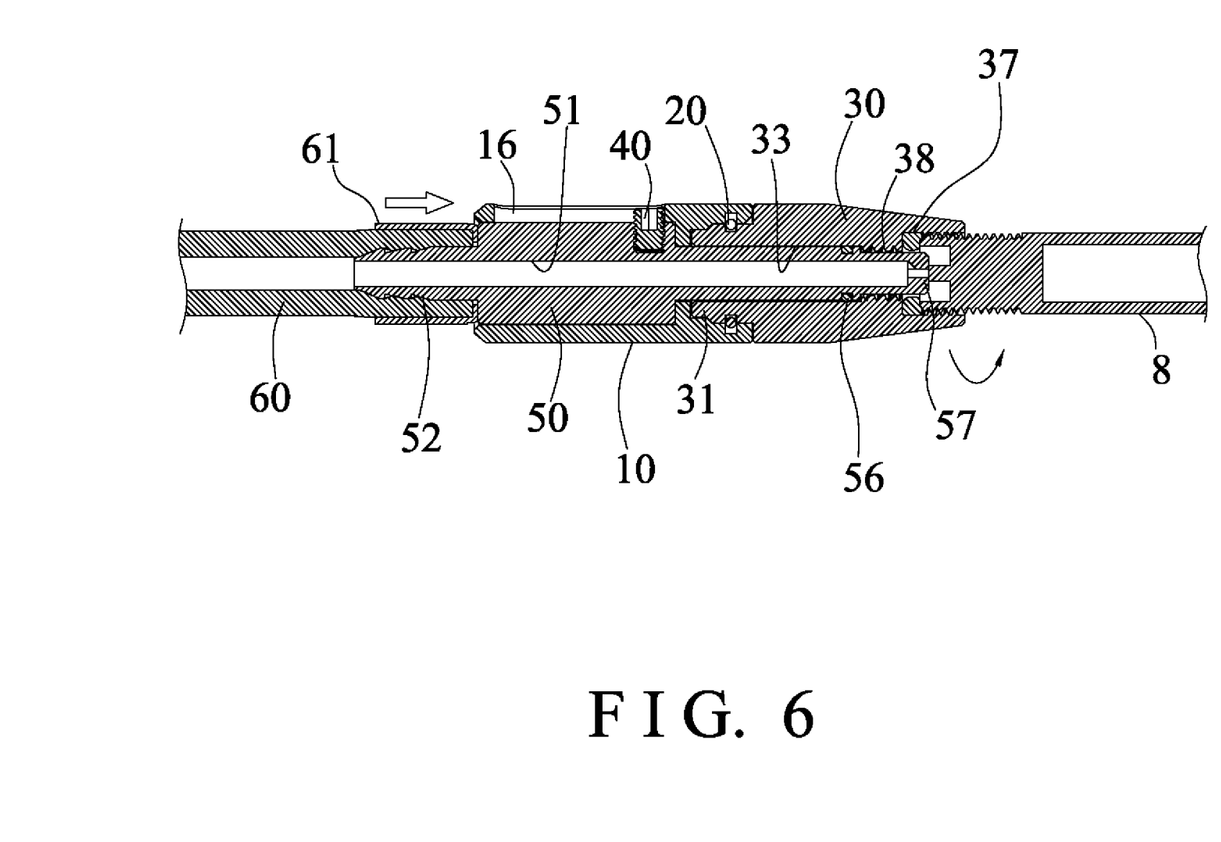

A cylindrical gasket 37 which is made of soft or resilient materials, such as rubber, plastic, composite materials, or other synthetic materials, is engaged into the space 34 of the barrel 30 for resiliently engaging with the inflation valve 8 and for making an air or water tight seal between the barrel 30 and the inflation valve 8 (FIGS. 5, 6). The barrel 30 further includes another screw hole or inner thread 38 formed therein for threading or engaging with another inflation valve 80, such as a French type inflation valve 80 (FIGS. 9-11) and thus for allowing either the U.S. type inflation valve 8 or the French type inflation valve 80 to be detachably or releasably or selectively attached or secured to the barrel 30, when required, by pivoting or rotating the barrel 30 relative to the housing 10 and the inflation valves 8, 80.

A mandrel or shank 50 is partially and slidably received or engaged in the chamber 11 of the housing 10, and includes a latch or anchor 40 attached or mounted or threaded or engaged onto the shank 50 and moved in concert with the shank 50, and slidably engaged in or with the longitudinal and the lateral slots 16, 17 of the housing 10 for guiding and limiting the shank 50 to slide relative to the housing 10 and for anchoring or retaining or positioning the shank 50 to the housing 10 at different or selected position. The shank 50 includes a compartment or bore 51 formed therein, and the shank 50 includes one or rear or first end portion 52 connected or coupled to a pipe or hose 60 which is connected or coupled to an air pump (not illustrated), a pressurized air reservoir or the like, for receiving the pressurized air therefrom and for allowing the pressurized air to flow into the bore 51 of the shank 50.

A clamp or shield 61 may further be provided and attached or engaged onto the hose 60 and the first end portion 52 of the shank 50 for solidly and stably and tightly clamping and securing or coupling the hose 60 to the shank 50 and for preventing the hose 60 from being disengaged or separated from the shank 50. The shank 50 includes an extension 53 extended forwardly therefrom and having a relatively decreased or reduced outer diameter than that of the shank 50 for forming or defining an inner peripheral shoulder 54 between the shank 50 and the extension 53 and for selectively contacting or engaging with the peripheral bulge 14 of the housing 10 which may guide and limit the shank 50 to slide or move longitudinally or axially relative to the housing 10. The extension 53 of the shank 50 is slidably received or engaged in the chamber 11 of the housing 10 and also slidably received or engaged in the bore 33 of the barrel 30.

Figure 11:
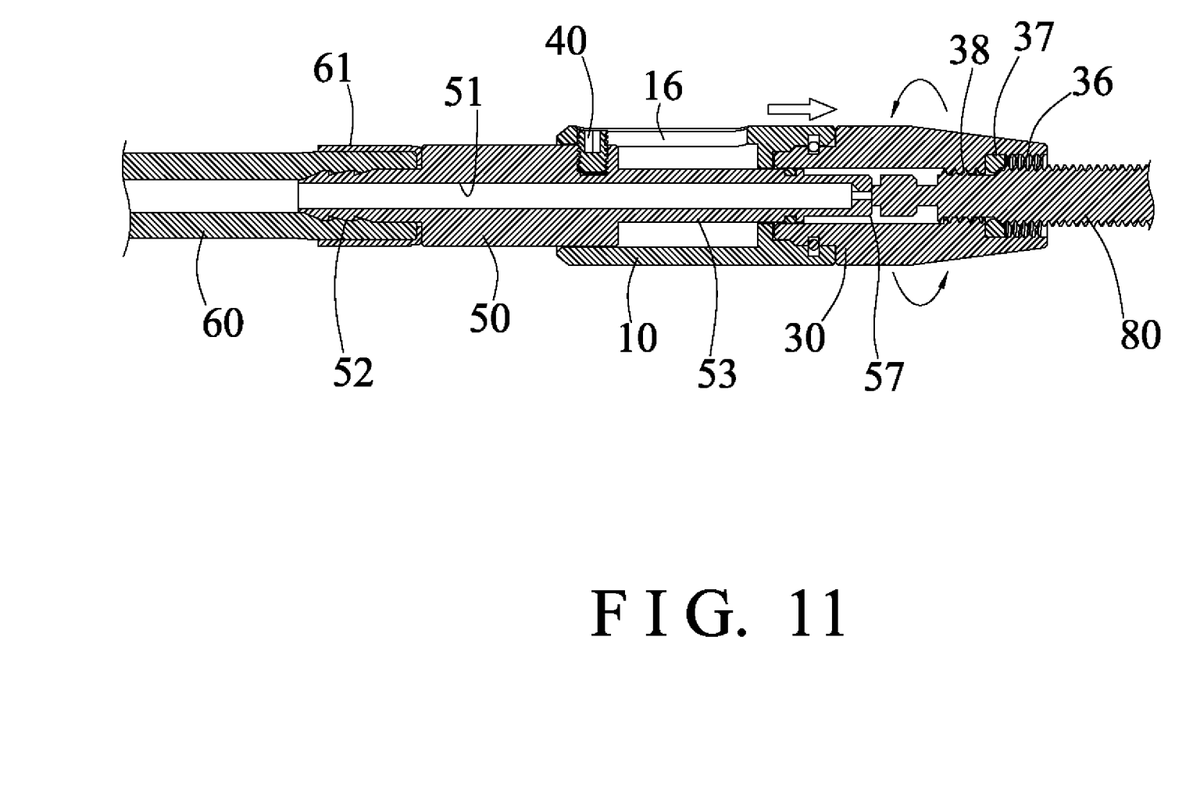

It is preferable that the shank 50 includes an annular or peripheral groove 55 formed therein, such as formed or provided in the extension 53 of the shank 50 for engaging with a gasket or sealing ring 56 which is also engaged with the barrel 30 for making an air or water tight seal between the barrel 30 and the shank 50. The shank 50 further includes a slit or mouth 57 formed or provided in the other or second end portion 58 thereof and/or formed or provided in the outer or free end portion of the extension 53 of the shank 50 for selectively contacting or engaging with either the U.S. type inflation valve 8 (FIG. 6) or the French type inflation valve 80 (FIG. 11).

Figure 4:
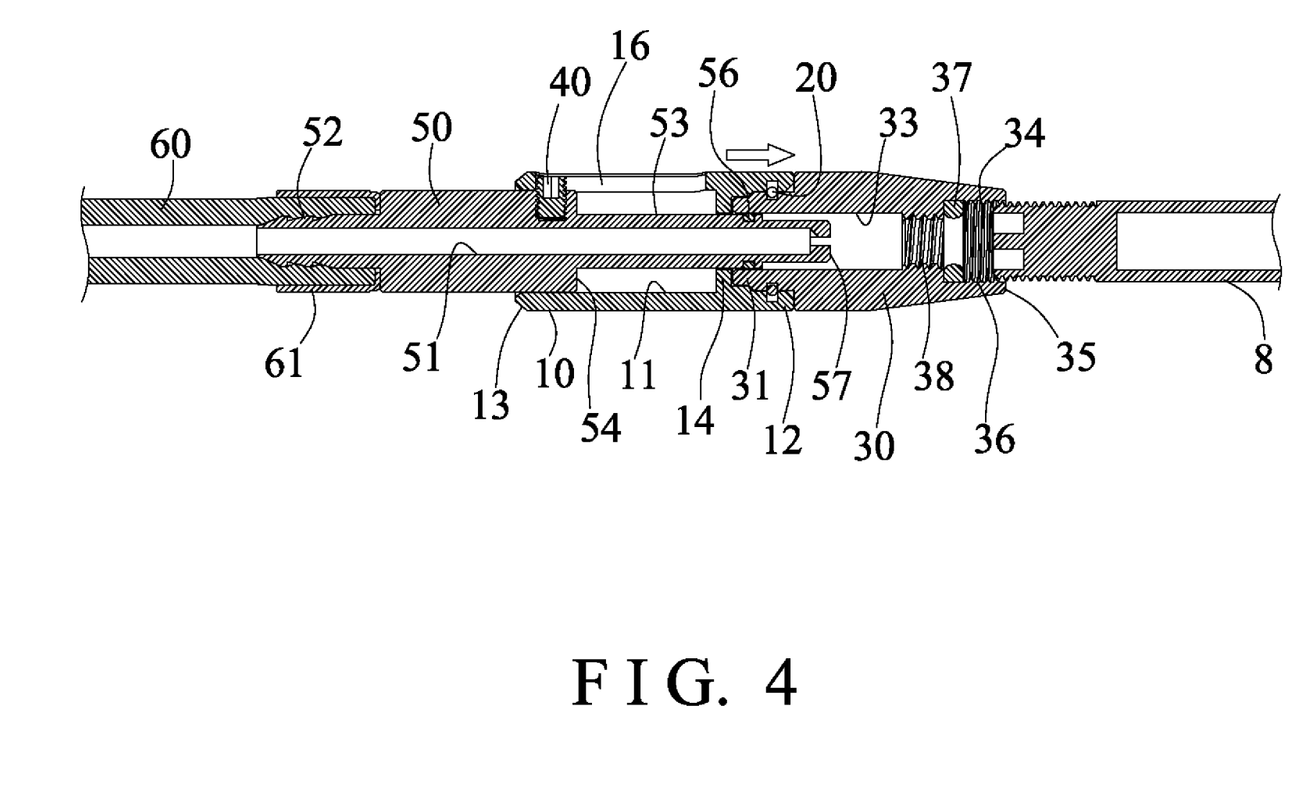
FIGS. 4, 5, 6 are cross sectional views similar to FIG. 3, illustrating the operation of the air valve connecting device for engaging with the inflation valve.
Figure 7:
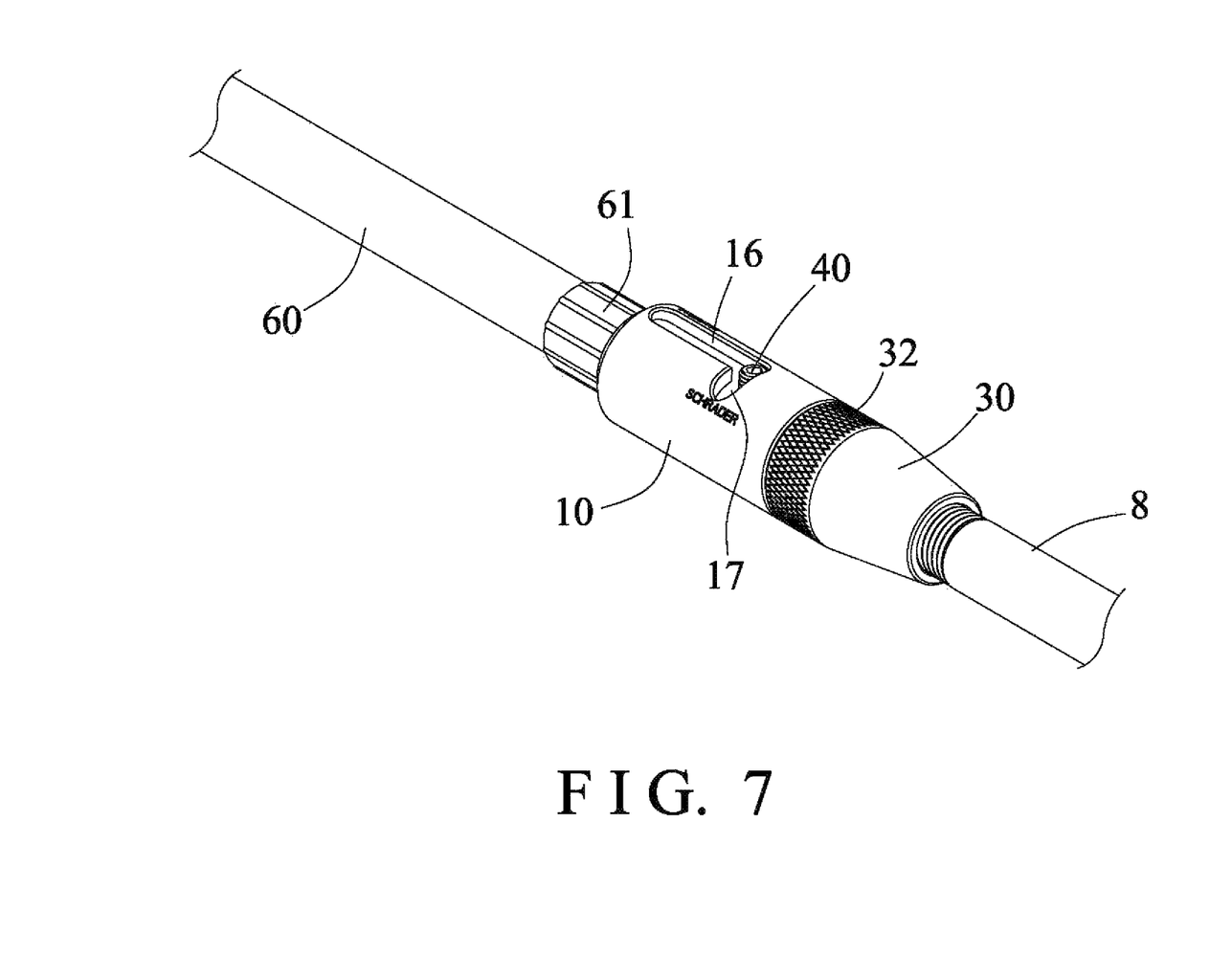
FIGS. 7, 8 are perspective views similar to FIG. 2, illustrating the operation of the air valve connecting device for engaging with the inflation valve.
Figure 8:
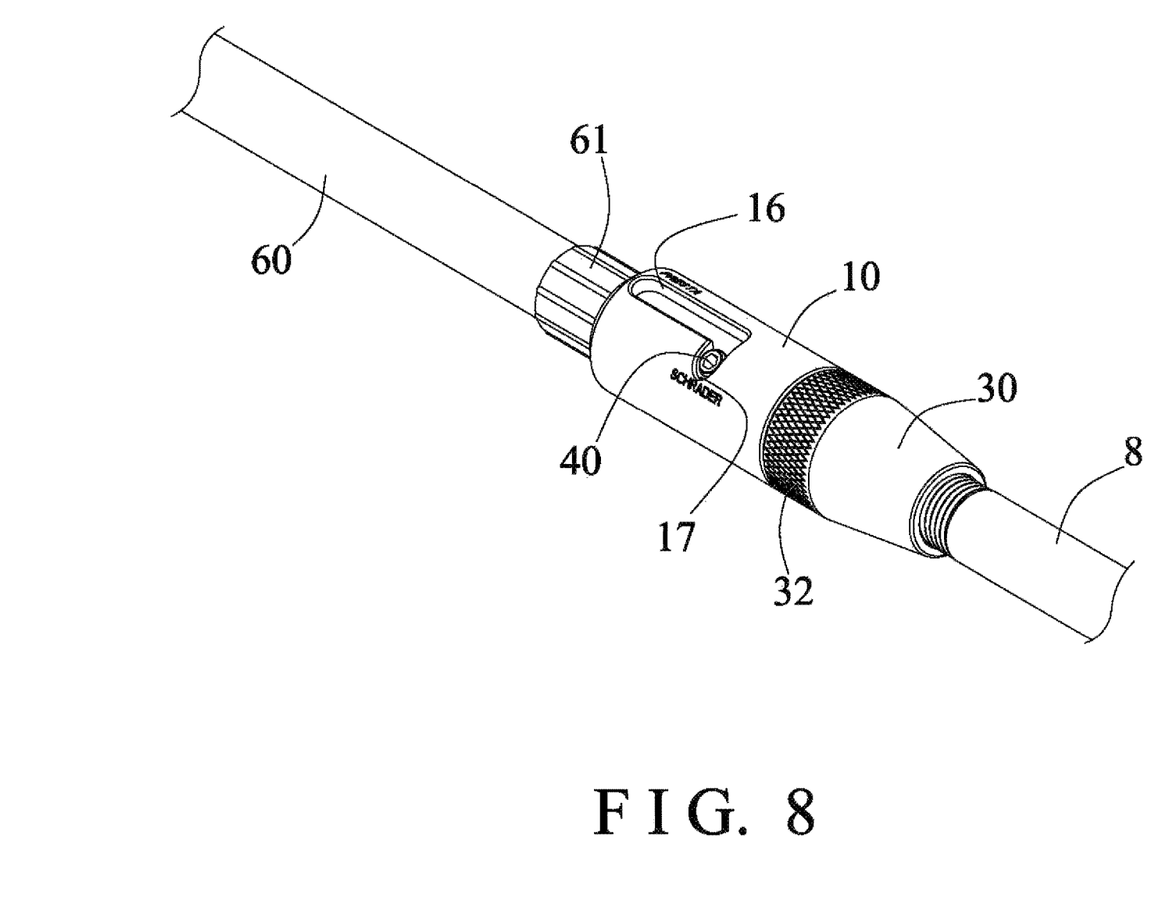

In operation, as shown in FIG. 4, when the U.S. type inflation valve 8 is required to be supplied and filled with a pressurized air, the U.S. type inflation valve 8 may first be moved toward the second end portion 35 of the barrel 30, and the barrel 30 may then be pivoted or rotated relative to the housing 10 and the shank 50 (FIG. 5) for threading or engaging the screw hole 36 of the barrel 30 with the inflation valve 8, best shown in FIG. 6, and for selectively forcing and moving the inflation valve 8 to contact or engage with the resilient and/or cylindrical gasket 37 (FIGS. 5, 6). As shown in FIGS. 6-8, the hose 60 and the shank 50 may then be moved forwardly toward the inflation valve 8 for selectively forcing and moving the mouth 57 of the shank 50 toward and/or to contact or engage with the inflation valve 8 and for allowing the pressurized air to be suitably and effectively supplied and filled into the inflation valve 8.

Figure 9:
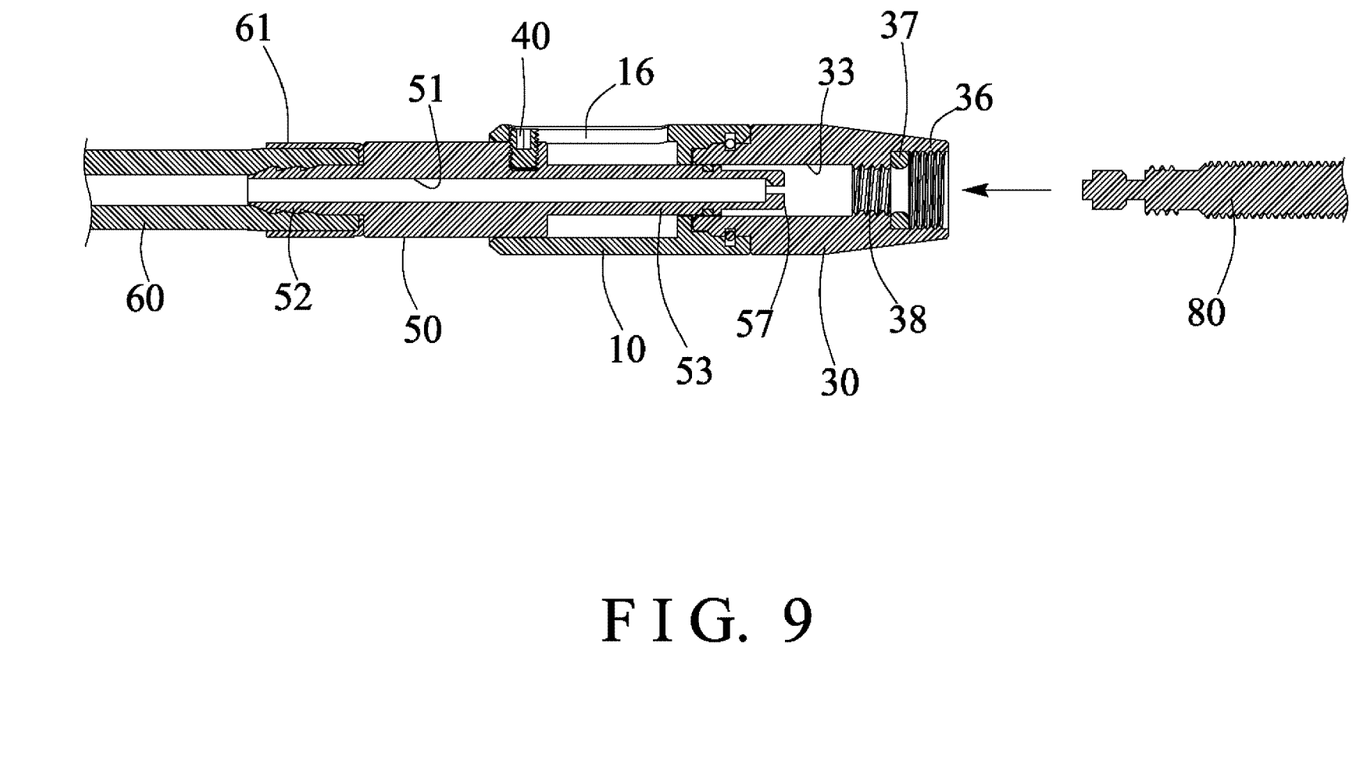
FIGS. 9, 10, 11 are cross sectional views similar to FIGS. 3-6, illustrating the operation of the air valve connecting device for engaging with the inflation valve.
Figure 10:
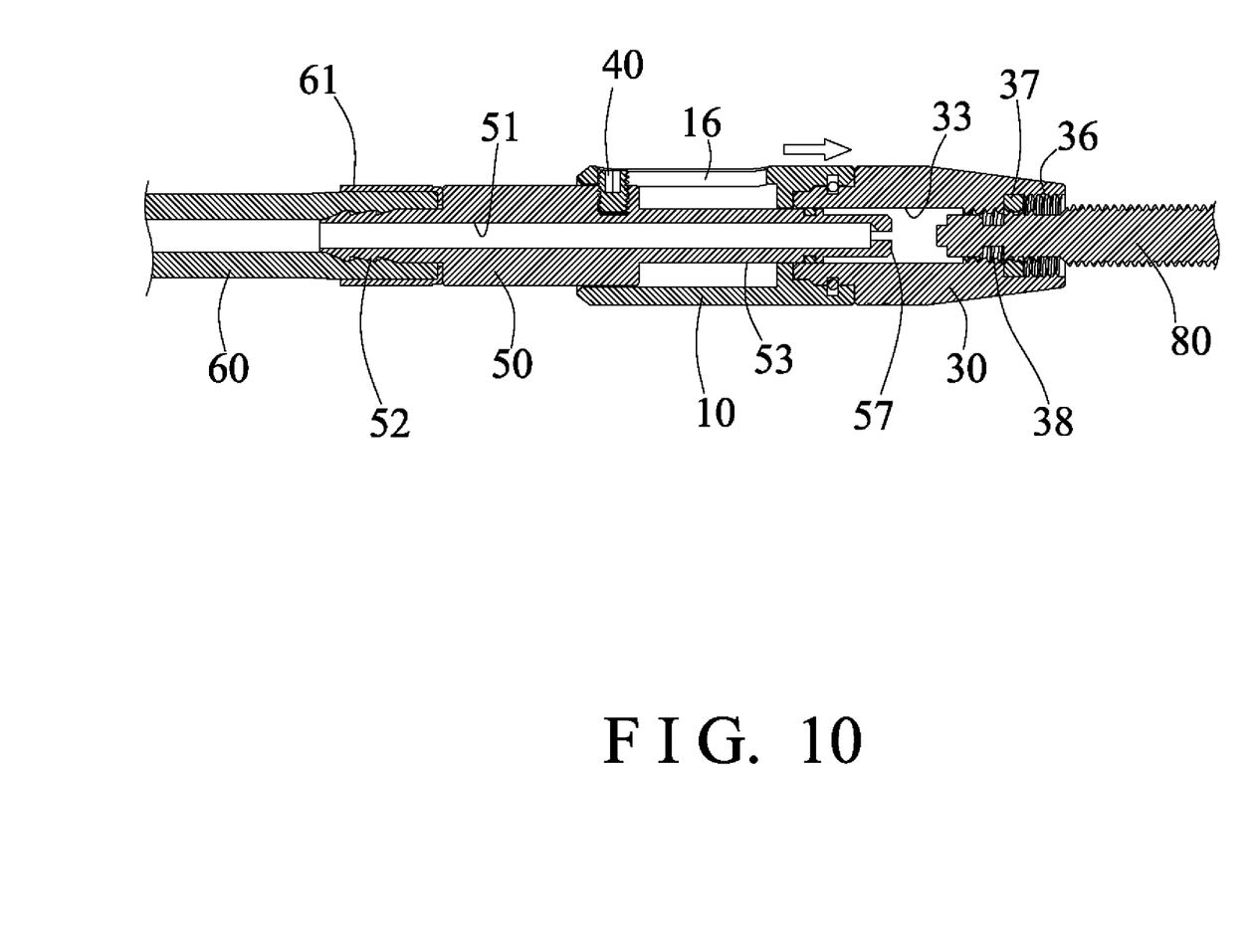

At this moment, as shown in FIG. 8, the anchor 40 may first be moved toward one end of the longitudinal slot 16 of the housing 10 and then moved and engaged into the lateral slot 17 of the housing 10 by pivoting or rotating the shank 50 and the hose 60 relative to the housing 10 and thus for allowing the shank 50 to be anchored or retained or positioned to the housing 10 at the required or selected position where the mouth 57 of the shank 50 is contacted or engaged with the inflation valve 8 (FIG. 6). Alternatively, as shown in FIGS. 9-11, when the French type inflation valve 80 is required to be supplied and filled with a pressurized air, the French type inflation valve 80 may be selectively moved toward the second end portion 35 of the barrel 30 and may be selectively threaded and secured to the barrel 30 by pivoting or rotating the barrel 30 relative to the housing 10 and the shank 50 (FIGS. 10, 11) for threading or engaging the inner thread 38 of the barrel 30 with the French type inflation valve 80, until the French type inflation valve 80 is contacted or engaged with the mouth 57 of the shank 50.

The air valve connecting device in accordance with the present invention may thus be easily and quickly engaged with either the U.S. type inflation valve 8 (FIG. 6) or the French type inflation valve 80 (FIG. 11) with a single hand of the user, and the mouth 57 of the shank 50 may also be easily and quickly forced and moved to engage with either the U.S. type inflation valve 8 (FIG. 6) or the French type inflation valve 80 (FIG. 11) with a single hand of the user.

Accordingly, the air valve connecting device in accordance with the present invention includes a simplified and improved structure for easily connecting to different inflation valves and for being easily actuated or operated with a single hand of the user and for being easily manufactured with a decreased manufacturing procedure and cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
   a housing including a chamber formed therein, and including a first end portion and a second end portion,
   a barrel including a first end portion rotatably connected to said housing, and said barrel including a bore formed therein, and said barrel including an enlarged space formed in a second end portion of said barrel and communicating with said bore of said barrel, and a screw hole formed in said space at said second end portion of said barrel for engaging with a U.S. type inflation valve and for detachably securing said U.S. type inflation valve to said barrel, and said barrel including an inner thread formed therein for selectively engaging with a French type inflation valve and for detachably securing said French type inflation valve to said barrel, and
   a shank slidably engaged in said chamber of said housing, said shank including a bore formed therein for receiving a pressurized air, and said shank including a first end portion for receiving the pressurized air, and said shank including a second end portion movable toward said barrel for selectively engaging with either said U.S. type inflation valve or said French type inflation valve,
   wherein
   said housing includes a peripheral bulge extended radially and inwardly into said chamber of said housing for engaging with said barrel and for limiting said barrel to move relative to said housing.

2. The air valve connecting device as claimed in claim 1, wherein said shank includes an extension extended forwardly therefrom and slidably engaged in said chamber of said housing and slidably engaged in said bore of said barrel.

3. The air valve connecting device as claimed in claim 2, wherein said shank includes a peripheral groove formed in said extension of said shank for engaging with a sealing ring which is engaged with said barrel for making an air tight seal between said barrel and said shank.

4. The air valve connecting device as claimed in claim 2, wherein said extension of said shank includes a reduced outer diameter than that of said shank for forming an inner peripheral shoulder between said shank and said extension.

5. The air valve connecting device as claimed in claim 4, wherein said housing includes a peripheral bulge extended radially and inwardly into said chamber of said housing for engaging with said inner peripheral shoulder of said shank for limiting said shank to move relative to said housing.

6. The air valve connecting device as claimed in claim 1, wherein said housing includes a slot formed therein, and an anchor is attached to said shank and slidably engaged with said slot of said housing for guiding and limiting said shank to move relative to said housing and said barrel.

7. The air valve connecting device as claimed in claim 6, wherein said slot of said housing is a longitudinal slot.

8. The air valve connecting device as claimed in claim 7, wherein said housing includes a lateral slot formed therein and communicating with said longitudinal slot of said housing for slidably engaging with said anchor.

9. The air valve connecting device as claimed in claim 1, wherein said barrel includes a gasket engaged into said barrel for engaging with said U.S. type inflation valve.

10. The air valve connecting device as claimed in claim 1, wherein a clamping ring is engaged between said barrel and said housing for positioning said barrel to said housing and for preventing said barrel from being disengaged from said housing.

11. An air valve connecting device comprising:
    a housing including a chamber formed therein, and including a first end portion and a second end portion,
    a barrel including a first end portion rotatably connected to said housing, and said barrel including a bore formed therein, and said barrel including an enlarged space formed in a second end portion of said barrel and communicating with said bore of said barrel, and a screw hole formed in said space at said second end portion of said barrel for engaging with a U.S. type inflation valve and for detachably securing said U.S. type inflation valve to said barrel, and said barrel including an inner thread formed therein for selectively engaging with a French type inflation valve and for detachably securing said French type inflation valve to said barrel, and
    a shank slidably engaged in said chamber of said housing, said shank including a bore formed therein for receiving a pressurized air, and said shank including a first end portion for receiving the pressurized air, and said shank including a second end portion movable toward said barrel for selectively engaging with either said U.S. type inflation valve or said French type inflation valve, wherein said first end portion of said shank is connected to a hose for receiving the pressurized air from said hose, said shank including an extension extended forwardly therefrom and slidably engaged in said chamber of said housing and slidably engaged in said bore of said barrel, wherein said shank includes a mouth provided in said second end portion at said extension thereof for selectively engaging with either said U.S. type inflation valve or said French type inflation valve.

12. An air valve connecting device comprising:

a housing including a chamber formed therein, and including a first end portion and a second end portion, a barrel including a first end portion rotatably connected to said housing, and said barrel including a bore formed therein, and said barrel including an enlarged space formed in a second end portion of said barrel and communicating with said bore of said barrel, and a screw hole formed in said space at said second end portion of said barrel for engaging with a U.S. type inflation valve and for detachably securing said U.S. type inflation valve to said barrel, and said barrel including an inner thread formed therein for selectively engaging with a French type inflation valve and for detachably securing said French type inflation valve to said barrel, and a shank slidably engaged in said chamber of said housing, said shank including a bore formed therein for receiving a pressurized air, and said shank including a first end portion for receiving the pressurized air, and said shank including a second end portion movable toward said barrel for selectively engaging with either said U.S. type inflation valve or said French type inflation valve, wherein said first end portion of said shank is connected to a hose for receiving the pressurized air from said hose.

13. The air valve connecting device as claimed in claim 12, wherein a shield is engaged onto said hose and said first end portion of said shank for clamping and securing said hose to said shank and for preventing said hose from being disengaged from said shank.

* * * * *